United States Patent
Li

(10) Patent No.: US 11,055,154 B2
(45) Date of Patent: Jul. 6, 2021

(54) SCREEN-SHOOTING METHOD AND DEVICE FOR GUEST OPERATING SYSTEM IN COMPUTER APPARATUS

(71) Applicant: CLOUDMINDS (SHENZHEN) ROBOTICS SYSTEMS CO., LTD., Guangdong (CN)

(72) Inventor: Yangang Li, Guangdong (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/667,780

(22) Filed: Oct. 29, 2019

(65) Prior Publication Data

US 2020/0065165 A1 Feb. 27, 2020

Related U.S. Application Data

(63) Continuation of application No. PCT/CN2018/079662, filed on Mar. 20, 2018.

(51) Int. Cl.
  *G06F 9/54* (2006.01)
  *G06F 9/455* (2018.01)
  (Continued)

(52) U.S. Cl.
  CPC ............ *G06F 9/543* (2013.01); *G06F 3/0484* (2013.01); *G06F 9/451* (2018.02); *G06F 9/452* (2018.02);
  (Continued)

(58) Field of Classification Search
  CPC ...................................................... G06F 9/543
  (Continued)

(56) References Cited

U.S. PATENT DOCUMENTS

| 2012/0185799 A1 | 7/2012 | Tsai |
| 2016/0350136 A1 | 12/2016 | Karlo et al. |
| 2018/0376097 A1 | 12/2018 | Luo et al. |

FOREIGN PATENT DOCUMENTS

| CN | 102799383 A | 11/2012 |
| CN | 102810040 A | 12/2012 |

(Continued)

OTHER PUBLICATIONS

International Search Report mailed in International Patent Application No. PCT/CN2018/079662, filed on Mar. 20, 2018, 4 pages.

(Continued)

*Primary Examiner* — Timothy A Mudrick
(74) *Attorney, Agent, or Firm* — Davis Wright Tremaine LLP

(57) ABSTRACT

The present disclosure provides a screen-shooting method and device for a guest operating system in a computer apparatus. The computer apparatus has a host operating system, and a guest operating system is displayed through a display window on the host operating system and assigned to the guest operating system. The method comprises: receiving a screen-shooting request from the guest operating system; looking up a layer corresponding to the display window on the host operating system and assigned to the guest operating system; and transmitting the layer to the guest operating system as the displayed guest operating system screenshot. Embodiments of the present disclosure make the screen-shooting for the guest operating system faster in an environment in which a plurality of operating systems are running simultaneously.

13 Claims, 4 Drawing Sheets

(51) Int. Cl.
*G06F 9/451* (2018.01)
*G06F 3/0484* (2013.01)

(52) U.S. Cl.
CPC ...... *G06F 9/45545* (2013.01); *G06F 9/45558* (2013.01); *G06F 2009/45579* (2013.01); *G06F 2009/45583* (2013.01)

(58) Field of Classification Search
USPC .......................................................... 719/319
See application file for complete search history.

(56) References Cited

FOREIGN PATENT DOCUMENTS

| | | | |
|---|---|---|---|
| CN | 104850327 | A | 8/2015 |
| CN | 104899039 | A | 9/2015 |
| CN | 105100664 | A | 11/2015 |
| CN | 107003875 | A | 8/2017 |
| CN | 108701045 | A | 10/2018 |
| JP | 2013205972 | A | 10/2013 |
| JP | 2017534959 | A | 11/2017 |
| WO | 2017032233 | A1 | 3/2017 |

OTHER PUBLICATIONS

Extended European Search Report dated Mar. 19, 2020, Patent Application No. 18910905.1-1224, 11 pages.
Chinese First Office Action dated Nov. 27, 2020, Patent Application No. 201880001055.0, 9 pages.
Japanese Decision to Grant a Patent dated Mar. 19, 2021, Patent Application No. 2019-553892, 3 pages.

SCREEN-SHOOTING METHOD AND DEVICE FOR GUEST OPERATING SYSTEM IN COMPUTER APPARATUS

CROSS-REFERENCE TO RELATED APPLICATION

The present application is a continuation of international application No. PCT/CN2018/079662, filed on Mar. 20, 2018, entitled "METHOD AND APPARATUS FOR CAPTURING SCREENSHOTS OF GUEST OPERATING SYSTEM IN COMPUTER DEVICE" which is incorporated herein by reference in its entirety.

TECHNICAL FIELD

The present disclosure relates to the technical field of operating system, and in particular, to a screen-shooting method and device for a guest operating system in a computer apparatus.

BACKGROUND

A plurality of operating systems may run on a computer apparatus. For example, the host operating system and several guest operating systems may run on a single computer apparatus at the same time. Hardwares in the computer apparatus, such as CPU, memory, and I/O apparatus, are shared among the plurality of operating systems. Each of the guest operating systems is assigned with a display window on the host operating system. When the guest operating system needs to be displayed, it is displayed in assigned the display window on the host operating system. When the guest operating system is running at the background, the assigned display window is switched to a hidden state. When the guest operating system is running in the foreground, the assigned display window is switched to a display state.

When the plurality of operating systems are running at the same time, a screenshot sometimes needs to be taken for the guest operating system. The screen-shooting method used at this time is the same as the screen-shooting method for a single operating system. That is, all the layers in a drawing repository of the guest operating system are traversed, and the content of the layers are drawn one by one into a storage area used for drawing. Then, the data in the area is read out, converted into a picture format for user, and rendered onto the display, so that a guest operating system screen-shooting is completed. This screen-shooting method is cumbersome.

SUMMARY

One of objects of the present disclosure is to make screen-shooting for guest operating system faster in an environment in which a plurality of operating systems are running simultaneously.

According to a first aspect of embodiments of the present disclosure, there is provided a screen-shooting method for a guest operating system in a computer apparatus, the computer apparatus has a host operating system, and a guest operating system is displayed through a display window on the host operating system and assigned to the guest operating system, the method comprising:

receiving a screen-shooting request from the guest operating system;

looking up a layer corresponding to the display window on the host operating system and assigned to the guest operating system; and transmitting the layer to the guest operating system as the displayed guest operating system screenshot.

In one embodiment, transmitting the layer to the guest operating system specifically comprises:

drawing the layer at a virtual address of a screenshot storage area in the host operating system; and transmitting contents stored in the screenshot storage area to the guest operating system.

In one embodiment, drawing the layer at a virtual address of a screenshot storage area in the host operating system specifically comprises:

drawing the layer at a virtual address of a screenshot storage area in the host operating system specifically comprises:

receiving a physical address of the screenshot storage area in the guest operating system;

translating the physical address into the virtual address of the screenshot storage area in the host operating system; and drawing the layer at the virtual address.

In one embodiment, the physical address of the screenshot storage area in the guest operating system is converted from a virtual address of the screenshot storage area in the guest operating system by a guest operating system kernel.

In one embodiment, the physical address of the screenshot storage area in the guest operating system specifically comprises: a physical starting address of the screenshot storage area in the guest operating system, and a size of the storage area; the virtual address of the screenshot storage area in the host operating system specifically comprises: a virtual starting address of the screenshot storage area in the host operating system, and a size of the storage area.

In one embodiment, the physical address of the screenshot storage area in the guest operating system specifically comprises: a physical starting address of the screenshot storage area in the guest operating system, and a size of the storage area; the virtual address of the screenshot storage area in the guest operating system specifically comprises: a virtual starting address of the screenshot storage area in the guest operating system, and a size of the storage area.

In one embodiment, the transmitting contents stored in the screenshot storage area to the guest operating system specifically comprises:

transmitting the contents stored in the screenshot storage area to the guest operating system through a channel between the host operating system and the guest operating system.

In one embodiment, the looking up a layer corresponding to the display window on the host operating system and assigned to the guest operating system specifically comprises:

looking up the layer corresponding to the display window assigned to the guest operating system from a display layer repository, wherein the display layer repository stores layers corresponding respectively to display windows on the host operating system and assigned to each of guest operating systems.

According to a second aspect of embodiments of the present disclosure, there is provided a screen-shooting for a guest operating system device in a computer apparatus, where, the computer apparatus has a host operating system, and a guest operating system is displayed through a display window on the host operating system and assigned to the guest operating system, the device comprising:

a receiving unit configured for receiving a screen-shooting request from the guest operating system;

a looking-up unit configured for looking up a layer corresponding to the display window on the host operating system and assigned to the guest operating system; and a transmitting unit configured for transmitting the layer to the guest operating system as a displayed guest operating system screenshot.

In one embodiment, the transmitting unit is further configured for drawing the layer at a virtual address of a screenshot storage area in the host operating system; and transmitting contents stored in the screenshot storage area to the guest operating system.

In one embodiment, drawing the layer at a virtual address of a screenshot storage area in the host operating system specifically comprises:

receiving a physical address of the screenshot storage area in the guest operating system;

translating the physical address into the virtual address of the screenshot storage area in the host operating system; and drawing the layer at the virtual address.

In one embodiment, the physical address of the screenshot storage area in the guest operating system is converted from a virtual address of the screenshot storage area in the guest operating system by a guest operating system kernel.

In one embodiment, the physical address of the screenshot storage area in the guest operating system specifically comprises: a physical starting address of the screenshot storage area in the guest operating system, and a size of the storage area; and the virtual address of the screenshot storage area in the host operating system specifically comprises: a virtual starting address of the screenshot storage area in the host operating system, and a size of the storage area.

In one embodiment, the physical address of the screenshot storage area in the guest operating system specifically comprises: a physical starting address of the screenshot storage area in the guest operating system, and a size of the storage area; and the virtual address of the screenshot storage area in the guest operating system specifically comprises: a virtual starting address of the screenshot storage area in the guest operating system, and a size of the storage area.

In one embodiment, transmitting contents stored in the screenshot storage area to the guest operating system specifically comprises: transmitting the contents stored in the screenshot storage area to the guest operating system through a channel between the host operating system and the guest operating system.

In one embodiment, the lookup unit is further configured for looking up the layer corresponding to the display window assigned to the guest operating system from a display layer repository, wherein the display layer repository stores layers corresponding respectively to display windows on the host operating system and assigned to each of guest operating systems.

According to a third aspect of embodiments of the present disclosure, there is provided a computer apparatus, comprising:

a memory configured for storing computer readable program instructions;

a processor configured for executing the computer readable program instructions stored in the memory to implement the screen-shooting method for a guest operating system according to the first aspect of embodiments of the present disclosure.

According to a fourth aspect of embodiments of the present disclosure, there is provided a computer readable medium storing computer readable program instructions thereon, when being executed by a processor, the computer readable program instructions implement the screen-shooting method for a guest operating system according to the first aspect of embodiments of the present disclosure.

The technical solutions provided by embodiments of the present disclosure may include the following beneficial effects:

In the case that the computer apparatus has a plurality of operating systems, a display window is assigned to each of guest operating systems on the host operating system. When the guest operating system needs to be displayed, it is displayed in the display window assigned on the host operating system. When performing the display, all the layers of the guest operating system have been traversed, the contents of the layers are stored one by one in the frame buffer, and then rendered in the display window assigned on the host operating system according to the contents stored in the frame buffer. When the guest operating system needs to perform screen-shooting, an operation similar to that of displaying on the host operating system is actually performed, except that when displaying on the host operating system, the content of the layer is stored in the frame buffer, and when screen-shooting, the content of the layer is stored in the screenshot storage area. Therefore, in embodiments of the present disclosure, when the guest operating system performs screen-shooting, an operation result acquired when performing displaying on the host operating system is adopted in order to avoid repeated operations, that is, the layers stored when performing displaying on the host operating system is directly sent to the guest operating system for displaying the screenshot of the guest operating system. Since the layers of the guest operating system acquired when performing displaying on the host operating system are acquired and thus they do not need to be re-acquired, the screen-shooting of the guest operating system is faster and the screen-shooting efficiency is improved.

Other features and advantages of the present disclosure will be apparent from the following detailed description, or be partly learned from the practice of the present disclosure.

It will be understood that the above general description and the following detailed description are intended to be illustrative and explanatory, and the present disclosure is not limited thereto.

DETAILED DESCRIPTION

The principles and spirit of the present disclosure are described below with reference to several exemplary embodiments. It will be understood that the embodiments are given only to enable those skilled in the art to better understand and then implement the present disclosure, but not intend to limit the scope of the present disclosure in any way. Rather, these embodiments are provided to make the present disclosure more thorough and complete, and to fully convey the scope of the present disclosure to those skilled in the art.

Those skilled in the art will appreciate that embodiments of the present disclosure may be implemented as a system, device, apparatus, method, or computer program product. Accordingly, the present disclosure may be implemented in form of complete hardware, complete software (including firmware, resident software, microcode, etc.), or a combination of hardware and software.

Figure 1:
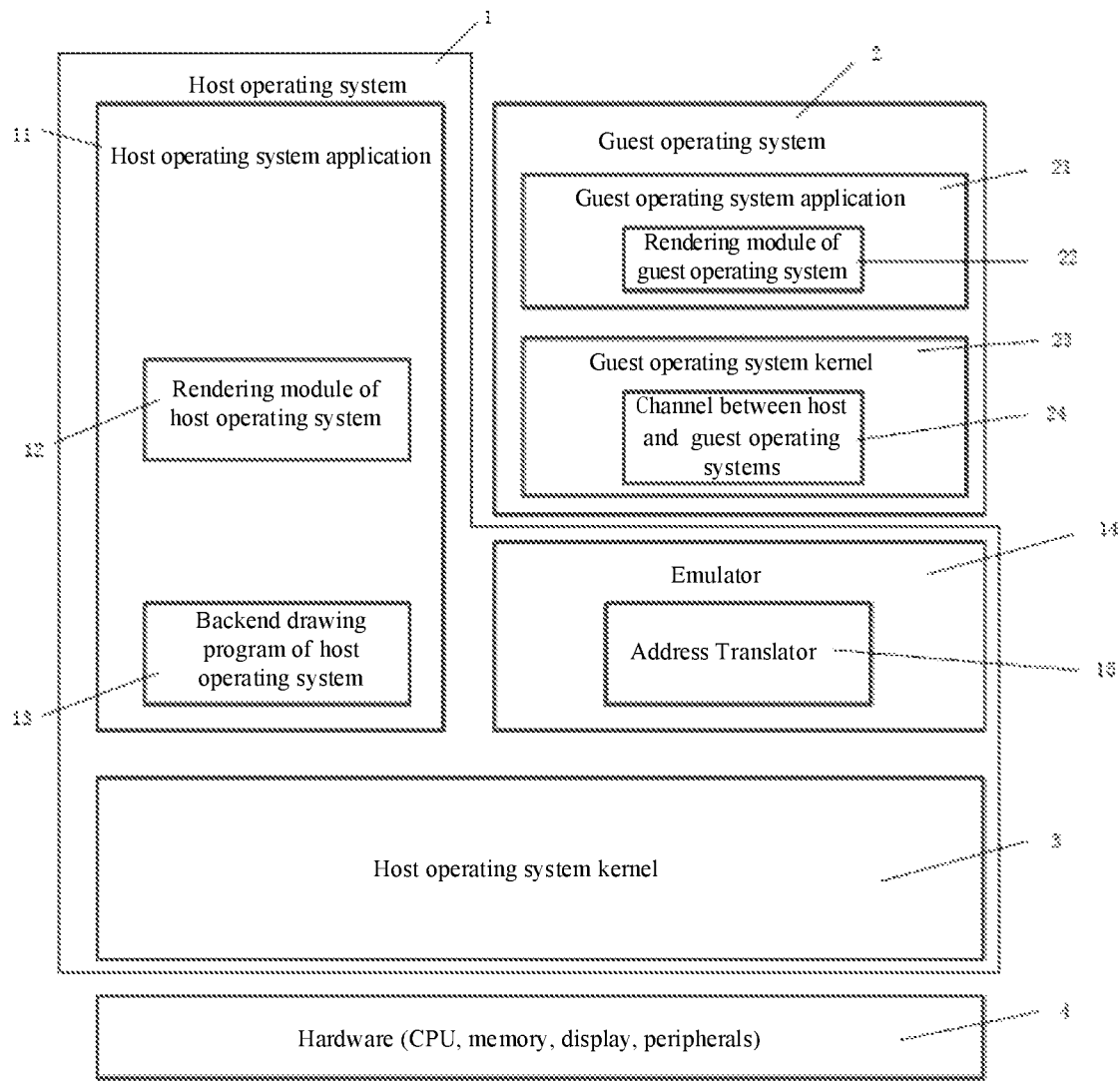
FIG. 1 is a schematic framework diagram of a computer apparatus with a plurality of operating systems according to an embodiment of the present disclosure.

FIG. 1 is a schematic framework diagram of a computer apparatus with a plurality of operating systems according to an embodiment of the present disclosure.

A plurality of operating systems refer to a plurality of operating systems running on a computer apparatus, one of which must be a host operating system 1, and the other ones may be one or more guest operating systems 2. The host operating system refers to the operating system that is preferentially run by the computer apparatus, and it is a computer program that manages and controls the hardware and software resources of the computer apparatus, and any other software or system may run only with the support of the host operating system. The guest operating system refers to a customer-facing operating system relying on the host operating system. When the guest operating system is running, a virtual machine emulates hardware apparatuses for the guest operating system to use. The virtual machine is run by an application of the host operating system. Therefore, the guest operating system relies on the host operating system.

As shown in FIG. 1, a host operating system 1 and a guest operating system 2 share hardwares 4 of the computer apparatus, including a CPU, a memory, peripherals, and so on. The host operating system 1 comprises a host operating system kernel 3 and a host operating system application 11. As mentioned above, the guest operating system relies on the host operating system, so the guest operating system 2 is also built on the host operating system kernel 3.

The guest operating system 2 runs on a hardware platform consisting of a virtual CPU, a virtual clock, a virtual interrupt manager and virtual peripherals managed by the virtual machine. The virtual CPU is a main unit instructed by the guest operating system 2 to execute and operate. The virtual clock provides a clock source for operations performed by the guest operating system, such as process scheduling. The virtual interrupt manager manages the interrupt signals generated by various virtual peripherals so as to provide to the virtual CPU. The virtual peripherals are various input and output apparatus modules implemented by the virtual machine. An emulator of virtual machine 14 running on the host operating system 1 controls a real CPU of the host operating system to start executing virtual machine instructions and switching from the host operating system to the guest operating system on the real CPU, and controls the guest operating system to continue executing or not execute after switching from the guest operating system to the host operating system. The emulator of virtual machine 14 also needs to operate and monitor real I/O apparatuses and associated files on the host operating system for usage by the virtual peripherals of the virtual machine. Therefore, the guest operating system 2 is also built on the emulator of virtual machine 14.

The emulator of virtual machine 14 comprises an address translator 15, and the function of the address translator 15 is described in detail later.

The host operating system application 11 comprises a backend drawing program of host operating system 13 and a rendering module of host operating system 12. As described above, a display window is assigned to each of guest operating systems on a host operating system. When a guest operating system needs to be displayed, it is displayed in the assigned display window on the host operating system. The backend drawing program of host operating system 13 is a program that traverses all the layers of the guest operating system and stores contents of the layers one by one into a frame buffer when performing such displaying. The rendering module of host operating system 12 is configured for performing rendering in the assigned display window on the host operating system according to the contents stored in the frame buffer.

The guest operating system 2 comprises a guest operating system kernel 23 and a guest operating system application 21. The guest operating system kernel 23 comprises a channel 24 between the host operating system and the guest operating system, which is described in detail below. The guest operating system application 21 comprises a rendering module of guest operating system 22. The screen-shooting method for the guest operating system in the existing technology is the same as the screen-shooting method for a single operating system. That is, all the layers in a drawing repository of the guest operating system are traversed, and contents of the layers are drawn one by one into the storage area used for drawing. Then, data in the area is read out and converted to an image format for users and then rendered onto the display, the rendering is performed by the rendering module of guest operating system 22.

In the case that the computer apparatus has a plurality of operating systems, as described above, when the guest operating system needs to perform screen-shooting, an operation similar to that of performing displaying on the host operating system is actually performed, except that, when performing displaying on the host operating system, the contents of the layers are stored in the frame buffer, and when performing screen-shooting, the contents of the layers are stored in a screenshot storage area. Therefore, in embodiments of the present disclosure, when the guest operating system performs screen-shooting, an operation result acquired when performing displaying on the host operating system is adopted in order to avoid repeated operations, that is, the layers stored when performing displaying on the host operating system is directly sent to the guest operating system for displaying the screenshot of the guest operating system. Since the layers of the guest operating system acquired when performing displaying on the host operating system are acquired and thus they do not need to be re-acquired, the screen-shooting of the guest operating system is faster and the screen-shooting efficiency is improved.

Figure 3:
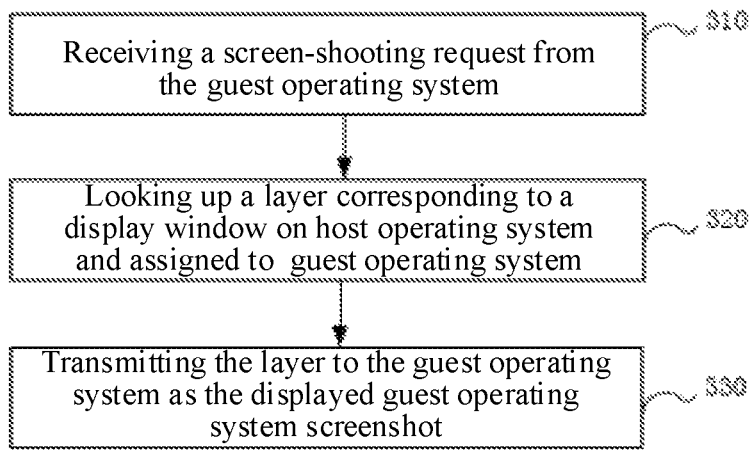
FIG. 3 is a flow chart of a screen-shooting method of a guest operating system in the computer apparatus according to an embodiment of the present disclosure.

As shown in FIG. 3, the screen-shooting method for the guest operating system according to embodiments of the present disclosure comprises:

Step 310: receiving a screen-shooting request from the guest operating system;

Step 320: looking up a layer corresponding to a display window on the host operating system and assigned to the guest operating system; and Step 330: transmitting the layer to the guest operating system as the displayed guest operating system screenshot.

These steps are described in detail below.

At step 310, the screen-shooting request is received from the guest operating system.

The screen-shooting request is a request for performing a screen-shooting operation. When a user transmits to the guest operating system a request for performing screen-shooting, a server end corresponding thereto is included in a layer drawing service of the guest operating system. The server end transmits the screen-shooting request to the host operating system 1 accordingly.

In step 320, the layer corresponding to the display window on the host operating system and assigned to the guest operating system is looked up.

As mentioned above, when the guest operating system needs to perform screen-shooting, an operation similar to performing displaying on the host operating system is actually performed, except that when performing displaying on the host operating system, the contents of the layers are stored in the frame buffer, and when performing screen-shooting, the contents of the layers are stored in the screen-shot storage area. Therefore, in embodiments of the present disclosure, when the guest operating system performs displaying on the host operating system, the contents of the layers of the guest operating system are placed in the display layer repository instead of the frame buffer, or the contents are placed in the display layer repository and the frame buffer at the same time. As such, in step 320, a layer corresponding to the display window assigned to the guest operating system is looked up from the display layer repository, wherein the display layer repository stores layers corresponding to display windows on the host operating system and assigned to respective guest operating systems.

In step 330, the layer is sent to the guest operating system as the displayed guest operating system screenshot.

In one embodiment, the content stored in the screenshot storage area is sent to the guest operating system via a channel 24 between the host operating system and the guest operating system. The content stored in the screenshot storage area is a layer of a display picture of the guest operating system in the assigned display window on the host operating system, and the guest operating system has only one layer when being displayed on the assigned window on the host operating system. The content of this layer is the same as the screenshot of the guest operating system. The screenshot of the guest operating system will be displayed when the layer is sent to the guest operating system.

Figure 4:
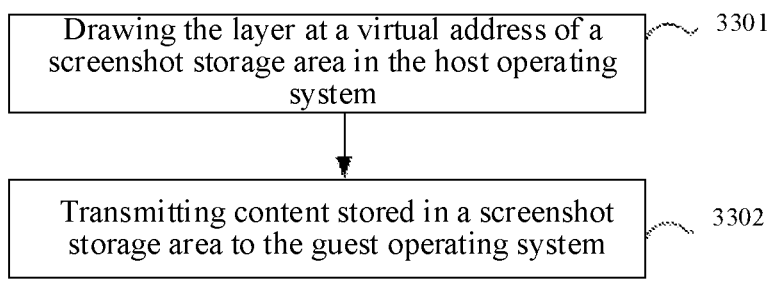
FIG. 4 is a detailed flow chart of step 330 in FIG. 3 according to an embodiment of the present disclosure.

In one embodiment, as shown in FIG. 4, the step 330 comprises:

Step 3301: drawing the layer at a virtual address of a screenshot storage area in the host operating system;

Step 3302: transmitting contents stored in the screenshot storage area to the guest operating system.

Figure 5:
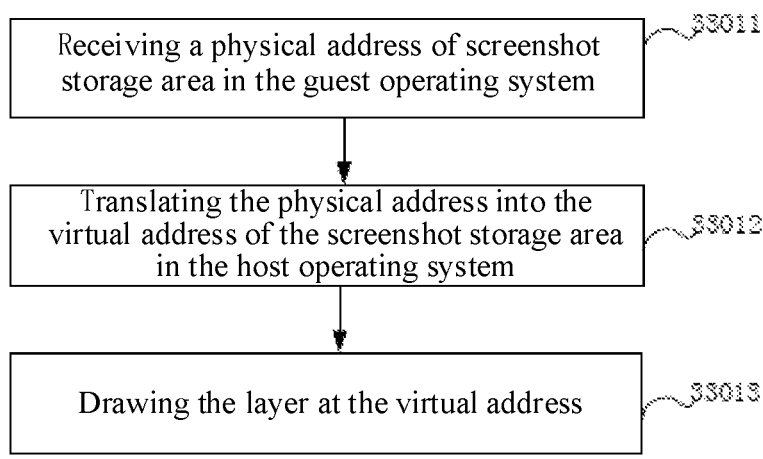
FIG. 5 is a detailed flow chart of step 3301 in FIG. 4 according to an embodiment of the present disclosure.

In one embodiment, as shown in FIG. 5, step 3301 comprises:

Step 33011: receiving a physical address of the screenshot storage area in the guest operating system;

Step 33012: translating the physical address into the virtual address of the screenshot storage area in the host operating system;

Step 33013: drawing the layer at the virtual address.

Figure 2:
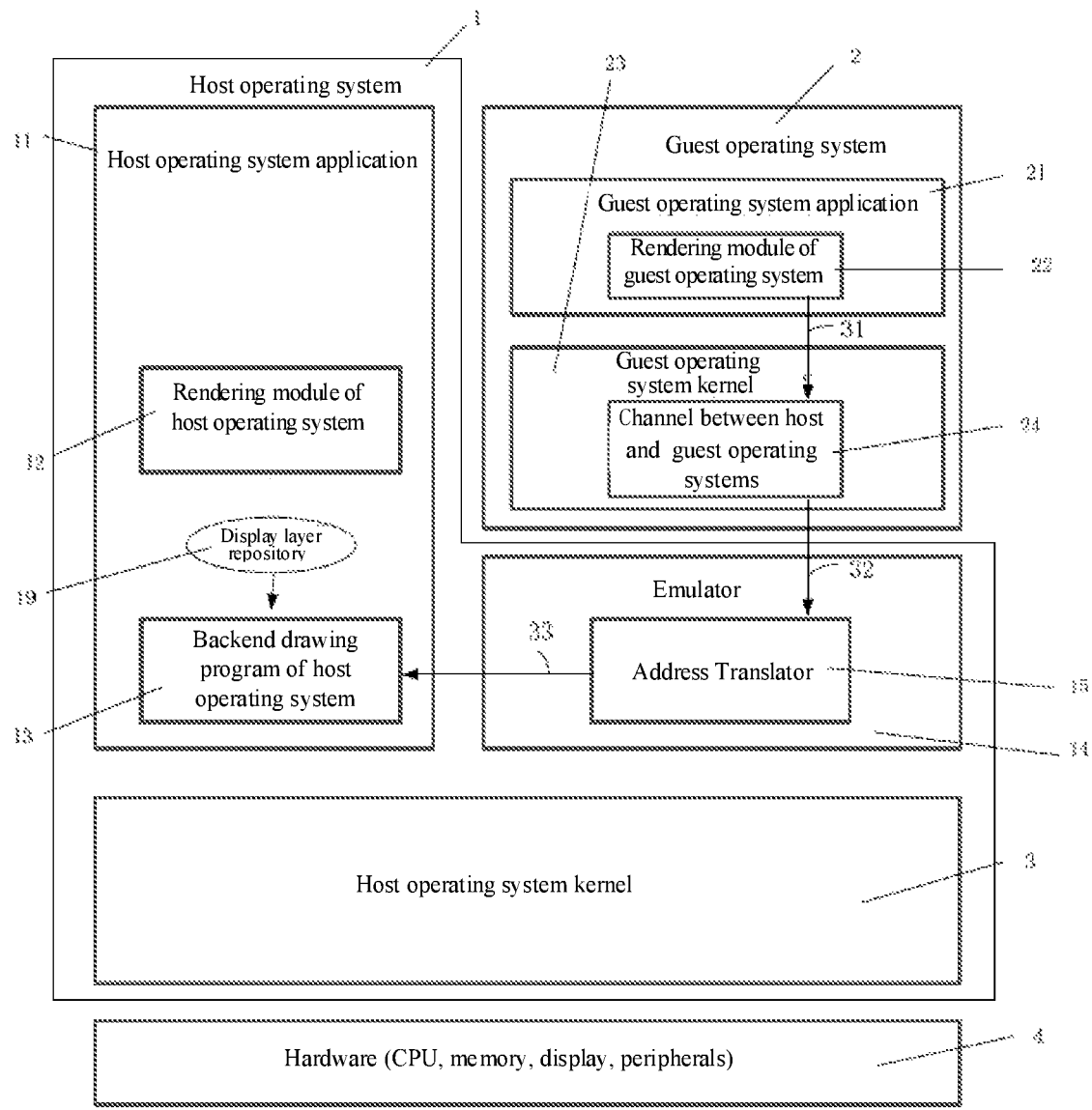
FIG. 2 is a schematic framework diagram of a computer apparatus further illustrating various address translation processes in FIG. 1 according to an embodiment of the present disclosure.

After the guest operating system transmits the screen-shooting request to the host operating system, the server end of the guest operating system applies in the guest operating system for a screenshot storage area for storing and saving screenshot data, and transmits a virtual address of the applied screenshot storage area in the guest operating system to the guest operating system kernel 23, as shown in FIG. 2. In one embodiment, the address may include a virtual starting address of the screenshot storage area in the guest operating system, and a size of the storage area. Alternatively, in another embodiment, the address may include a virtual starting address and a virtual ending address of the screenshot storage area in the guest operating system. As a specific example, the address may be sent to the guest operating system kernel 23 in the following information form: {drawing operation, virtual starting address of the screenshot storage area in the guest operating system, size of the storage area}.

In one embodiment, the guest operating system kernel 23 translates the virtual address 31 of the screenshot storage area in the guest operating system into the physical address 32 of the screenshot storage area in the guest operating system. The translation may be implemented by using a storage management mechanism of the guest operating system kernel. The reason for translating the virtual address of the screenshot storage area in the guest operating system into the physical address of the screenshot storage area in the guest operating system lies in that the virtual address of the screenshot storage area in the guest operating system is assigned by the guest operating system application 21, which is not a real address and is only valid within the guest operating system. If this virtual address is transmitted to the host operating system, the host operating system cannot establish a mapping with the virtual address within the host operating system, or, even if the mapping is established, it makes no sense. For example, in a case that the computer apparatus has a plurality of guest operating systems, a same virtual address actually corresponds to two different physical locations in different guest operating systems. As such, it is impossible to know virtual addresses of the host operating system that correspond to the screenshot storage area expected to be occupied by the guest operating system, such that the layer corresponding to the display window on the host operating system and assigned to the guest operating system cannot be transmitted to the guest operating system.

In one example, assuming that the address information sent to the guest operating system kernel 23 is {drawing operation, virtual starting address of the screenshot storage area in the guest operating system, size of the storage area}, after the guest operating system kernel 23 performs translating, {drawing operation, physical starting address of the screenshot storage area in the guest operating system, size of the storage area} is acquired.

Then, in one embodiment, the guest operating system kernel 23 transmits the physical address 32 of the screenshot storage area in the guest operating system to the address translator 15, as shown in FIG. 2. The address translator 15 translates the physical address 32 of the screenshot storage area in the guest operating system into a virtual address 33 of the screenshot storage area in the host operating system. In one embodiment, a correspondence table for the physical address 32 of the screenshot storage area in the guest operating system and the virtual address 33 of the screenshot storage area in the host operating system may be pre-stored in the address translator 15. The translation is implemented by looking up the correspondence table.

In one embodiment, the physical address of the screenshot storage area in the guest operating system specifically comprises: a physical starting address of the screenshot storage area in the guest operating system, and a size of the storage area; the virtual address of the screenshot storage area in the host operating system specifically comprises: a virtual starting address of the screenshot storage area in the host operating system, and a size of the storage area. As a specific example, the physical address of the screenshot storage area in the guest operating system may has the following information format: {drawing operation, physical starting address of the screenshot storage area in the guest operating system, size of the storage area}; the virtual address of the screenshot storage area in the host operating system may has the following information format: {drawing operation, virtual starting address of the screenshot storage area in the host operating system, size of the storage area}.

In another embodiment, the physical address of the screenshot storage area in the guest operating system specifically comprises: a physical starting address and a physical ending address of the screenshot storage area in the guest operating system; the virtual address of the screenshot storage area in the host operating system specifically comprises: a virtual starting address and a virtual ending address of the screenshot storage area in the host operating system.

Then, the address translator 15 transmits the translated virtual address of the screenshot storage area in the host operating system to the backend drawing program of host operating system 13, as shown in FIG. 2. The backend drawing program of host operating system 13 draws the layer corresponding to the display window assigned for the guest operating system on the host operating system and acquired from the display layer repository 19, into the area at the virtual address of the screenshot storage area in the host operating system. After the drawing is completed, the contents of the screenshot storage area in the area of the virtual address in the host operating system (that is, the layer of the guest operating system) is sent to the guest operating system as the displayed guest operating system screenshot.

Embodiments of the present disclosure adopt an address translator to translate the physical address of the screenshot storage area in the guest operating system into the virtual address of the screenshot storage area in the host operating system. With this address translation, it is easy to establish a mapping between the virtual address in the host operating system and the physical address in the guest operating system, such that the host operating system 1 knows that placing, at a virtual address of the host operating system, the layer corresponding to the display window on the host operating system and assigned to the guest operating system is equivalent to placing it at a real physical address that can be used by the guest operating system for displaying screenshot, thus greatly improving the efficiency of screen-shooting of the guest operating system.

Figure 6:
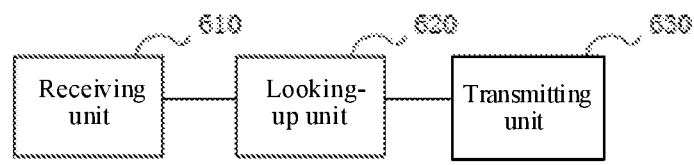
FIG. 6 is a block diagram of a guest operating system screen-shooting device in the computer apparatus according to an embodiment of the present disclosure.

As shown in FIG. 6, according to an embodiment of the present disclosure, there is also provided a screen-shooting device for guest operating system in a computer apparatus, the computer apparatus having a host operating system, and a guest operating system being displayed through a display window on the host operating system and assigned to the guest operating system, the device comprising:

a receiving unit 610, configured to receive a screen-shooting request from the guest operating system;

a lookup unit 620, configured to look up a layer corresponding to the display window allocated to the guest operating system on the host operating system;

a transmitting unit 630, configured to transmit the layer to the guest operating system as the displayed guest operating system screenshot.

Optionally, the transmitting unit 630 is further configured to:

draw the layer at a virtual address of a screenshot storage area in the host operating system;

transmit content stored in the screenshot storage area to the guest operating system.

Optionally, drawing the layer at a virtual address of a screenshot storage area in the host operating system specifically comprises:

receiving a physical address of the screenshot storage area in the guest operating system;

translating the physical address into the virtual address of the screenshot storage area in the host operating system;

drawing the layer at the virtual address.

Optionally, the physical address of the screenshot storage area in the guest operating system is converted from a virtual address of the screenshot storage area in the guest operating system by a kernel of the guest operating system.

Optionally, the physical address of the screenshot storage area in the guest operating system specifically comprises: a physical starting address of the screenshot storage area in the guest operating system, and a size of the storage area; the virtual address of the screenshot storage area in the host operating system specifically comprises: a virtual starting address of the screenshot storage area in the host operating system, and a size of the storage area.

Optionally, the physical address of the screenshot storage area in the guest operating system specifically comprises: a physical starting address of the screenshot storage area in the guest operating system, and a size of the storage area; the virtual address of the screenshot storage area in the guest operating system specifically comprises: a virtual starting address of the screenshot storage area in the guest operating system, and a size of the storage area.

Optionally, transmitting content stored in the screenshot storage area to the guest operating system specifically comprises:

transmitting the content stored in the screenshot storage area to the guest operating system through a channel between the host operating system and the guest operating system.

Optionally, the lookup unit is further configured to:

look up a layer corresponding to the display window allocated to the guest operating system from a display layer repository, wherein the display layer repository stores the layer corresponding to the display window allocated to each guest operating system on the host operating system.

A computer apparatus 800 according to an embodiment of the present disclosure is described below with reference to FIG. 7. The computer apparatus 800 shown in FIG. 7 is merely an example and should not impose any limitation on the function and use range of embodiments of the present invention.

Figure 7:
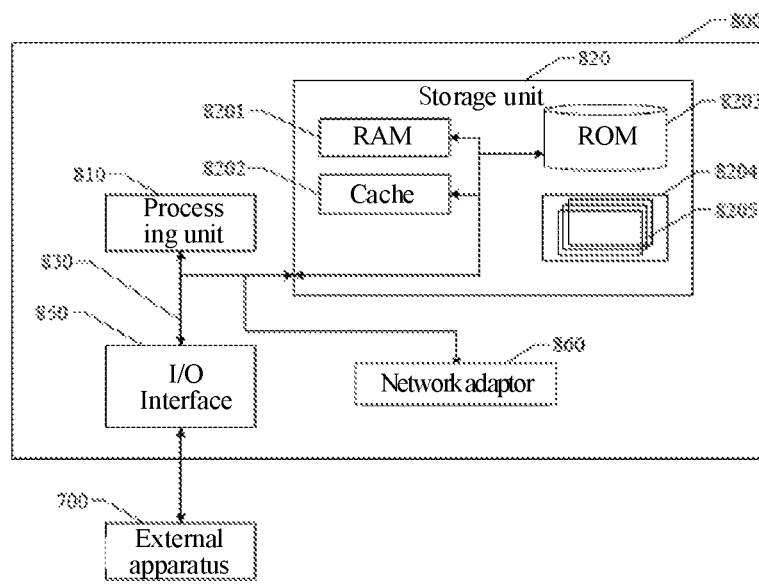
FIG. 7 is a hardware structural diagram of the computer apparatus according to an embodiment of the present disclosure.

As shown in FIG. 7, the computer apparatus 800 is embodied in the form of a general purpose computing apparatus. Components of the computer apparatus 800 may include, but are not limited to, at least one processing unit 810, at least one storage unit 820, and a bus 830 that connects different system components (including the storage unit 820 and the processing unit 810).

Wherein, the storage unit stores program code, which can be executed by the processing unit 810, such that the processing unit 810 performs steps according to various exemplary embodiments of the present invention described in the description section of the above exemplary method of the present specification. For example, the processing unit 810 can perform various steps shown in FIG. 3.

The storage unit 820 may include a readable medium in the form of a volatile storage unit, such as a random access storage unit (RAM) 8201 and/or a cache storage unit 8202, and may further include a read only storage unit (ROM) 8203.

The storage unit 820 may also include a program/utility 8204 having a set (at least one) of the program modules 8205, including but not limited to: an operating system, one or more applications, other program modules, and program data, each of these examples or a combination of these examples may include implementations in a network environment.

Bus 830 may represent one or more of several types of bus structures, including a memory unit bus or memory unit controller, a peripheral bus, a graphics acceleration port, a processing unit, or a local bus using any of a variety of bus structures.

Computer apparatus 800 may also communicate with one or more external apparatuses 700 (e.g., a keyboard, a pointing device, a Bluetooth apparatus, etc.), and may also communicate with one or more apparatus that enable a user to interact with the computer apparatus 800, and/or any apparatus (e.g., router, modem, etc.) that enables the computer apparatus 800 to communicate with one or more other computing apparatus. This communication may be performed via an input/output (I/O) interface 650. Also, the computer apparatus 800 may communicate with one or more networks (e.g., a local area network (LAN), a wide area network (WAN), and/or a public network, such as the Internet) via a network adapter 860. As shown, the network adapter 860 communicates with other modules of the computer apparatus 800 via the bus 830. It should be understood that although not shown in the figures, other hardware and/or software modules may be utilized in connection with the computer apparatus 800, including but not limited to: microcode, apparatus driver, redundant processing unit, external disk drive array, RAID system, tape drive, and data backup storage system, etc.

Through the description of the above embodiments, those skilled in the art will readily understand that the example embodiments described herein may be implemented by software or by software in combination with necessary hardware. Therefore, the technical solution according to embodiments of the present disclosure may be embodied in the form of a software product, which may be stored in a non-volatile storage medium (which may be a CD-ROM, USB flash drive, mobile hard disk, etc.) or on a network, include a number of instructions to enable a computing apparatus (which may be a personal computer, server, terminal device, or network apparatus, etc.) to perform the method according to embodiments of the present disclosure.

In an exemplary embodiment of the present disclosure, there is also provided a computer program medium having stored thereon computer readable instructions, when being executed by the processor of a computer, the computer readable instructions enable the computer to perform the method described in the above method embodiment.

According to an embodiment of the present disclosure, there is also provided a program product for implementing the method in the above method embodiment, which may adopt a portable compact disk read only memory (CD-ROM) and comprise program code, and may run at a terminal apparatus, such as a personal computer. However, the program product of the present invention is not limited thereto, and in the present document, the readable storage medium may be any tangible medium containing or storing a program that can be used by or in connection with an instruction execution system, device, or means.

The program product may employ any combination of one or more readable media. The readable medium may be a readable signal medium or a readable storage medium. The readable storage medium may be, for example, but not limited to, an electronic, magnetic, optical, electromagnetic, infrared, or semiconductor system, device, or means, or any combination of the above. More specific examples (non-exhaustive lists) of readable storage media include: electrical connection with one or more wires, portable disk, hard disk, random access memory (RAM), read only memory (ROM), erasable programmable read-only memory (EPROM or flash memory), optical fiber, portable compact disk read only memory (CD-ROM), optical storage means, magnetic storage means, or any suitable combination of the foregoing.

The computer readable signal medium may include a data signal that is propagated in the baseband or as part of a carrier, carrying readable program code. Such propagated data signals may take a variety of forms including but not limited to, electromagnetic signal, optical signal, or any suitable combination of the foregoing. The readable signal medium may also be any readable medium other than the readable storage medium that can transmit, propagate, or transport a program for use by or in connection with an instruction execution system, device or means.

Program code contained in a readable medium may be transmitted by any suitable medium, including but not limited to wireless, wired, optical cable, RF, etc., or any suitable combination of the foregoing.

Program code for performing the operations of the present disclosure may be written in any combination of one or more programming languages, including object oriented programming language, such as Java, C++, etc., and including conventional procedural programming language, such as C language or similar programming language. The program code may be executed entirely on a user computing apparatus, partially on a user computing apparatus, as a stand-alone software package, partially on a user computing apparatus and partially on a remote computing apparatus, or entirely on a remote computing apparatus or on a server. In the case of a remote computing apparatus, the remote computing device may be connected to the user computing apparatus via any kind of network, including a local area network (LAN) or wide area network (WAN), or may be connected to an external computing apparatus, such as utilizing an Internet service provider.

It should be noted that although several modules or units of the apparatus for action execution are mentioned in the detailed description above, such division is not mandatory. Indeed, in accordance with embodiments of the present disclosure, the features and functions of two or more modules or units described above may be embodied in one module or unit. Conversely, the features and functions of one of the modules or units described above may be further divided to be embodied by multiple modules or units.

In addition, although the various steps of the method of the present disclosure are described in a particular order in the drawings, this is not required or implied that the steps must be performed in the specific order, or all the steps shown must be performed to achieve the desired result. Additionally or alternatively, certain steps may be omitted, multiple steps may be combined into one step for execution, and/or one step may be decomposed into multiple steps for execution, etc.

Through the description of the above embodiments, those skilled in the art will readily understand that the example embodiments described herein may be implemented by software or by software in combination with necessary hardware. Therefore, the technical solution according to embodiments of the present disclosure may be embodied in the form of a software product, which may be stored in a non-volatile storage medium (which may be a CD-ROM, USB flash drive, mobile hard disk, etc.) or on a network, includes a number of instructions to enable a computing apparatus (which may be a personal computer, server, mobile terminal, or network apparatus, etc.) to perform the method according to embodiments of the present disclosure.

Other embodiments of the present disclosure will be readily apparent to those skilled in the art after learning the present specification and practicing the disclosed invention herein. The present application is intended to cover any variations, uses, or adaptations of the present disclosure, which are in accordance with the general principles of the present disclosure and comprise common general knowledge or common technical means in the art that are not disclosed in the present disclosure. The specification and examples are to be considered as illustrative only and the real scope and spirit of the present disclosure are pointed out by the attached claims.

What is claimed is:

1. A screen-shooting method for a guest operating system in a computer apparatus, wherein, the computer apparatus comprises a host operating system, and a guest operating system is displayed through a display window on the host operating system and assigned to the guest operating system, the method comprising:
    receiving a screen-shooting request from the guest operating system;
    looking up a layer corresponding to the display window on the host operating system and assigned to the guest operating system; and
    transmitting the layer to the guest operating system as a displayed guest operating system screenshot,
    wherein the transmitting the layer to the guest operating system comprises:
        drawing the layer at a virtual address of a screenshot storage area in the host operating system; and
        transmitting contents stored in the screenshot storage area to the guest operating system,
    wherein, the drawing the layer at a virtual address of a screenshot storage area in the host operating system specifically comprises:
        receiving a physical address of the screenshot storage area in the guest operating system;
        translating the physical address into the virtual address of the screenshot storage area in the host operating system; and
        drawing the layer at the virtual address.

2. The method according to claim 1, wherein the physical address of the screenshot storage area in the guest operating system is converted from a virtual address of the screenshot storage area in the guest operating system by a guest operating system kernel.

3. The method according to claim 1, wherein,
    the physical address of the screenshot storage area in the guest operating system specifically comprises: a physical starting address of the screenshot storage area in the guest operating system, and a size of the storage area; and
    the virtual address of the screenshot storage area in the host operating system specifically comprises: a virtual starting address of the screenshot storage area in the host operating system, and a size of the storage area.

4. The method according to claim 2, wherein,
    the physical address of the screenshot storage area in the guest operating system specifically comprises: a physical starting address of the screenshot storage area in the guest operating system, and a size of the storage area; and
    the virtual address of the screenshot storage area in the guest operating system specifically comprises: a virtual starting address of the screenshot storage area in the guest operating system, and a size of the storage area.

5. The method according to claim 1, wherein the transmitting contents stored in the screenshot storage area to the guest operating system specifically comprises:
    transmitting the contents stored in the screenshot storage area to the guest operating system through a channel between the host operating system and the guest operating system.

6. The method according to claim 1, wherein the looking up a layer corresponding to the display window on the host operating system and assigned to the guest operating system specifically comprises:
    looking up the layer corresponding to the display window assigned to the guest operating system from a display layer repository, wherein the display layer repository stores layers corresponding respectively to display windows on the host operating system and assigned to each of guest operating systems.

7. A computer apparatus, comprising:
    a memory configured for storing computer readable program instructions;
    a processor configured for executing the computer readable program instructions stored in the memory to implement a screen-shooting method for a guest operating system, the method comprising:
    receiving a screen-shooting request from the guest operating system;
    looking up a layer corresponding to a display window on a host operating system and assigned to the guest operating system; and
    transmitting the layer to the guest operating system as a displayed guest operating system screenshot,
    wherein the transmitting the layer to the guest operating system comprises:
        drawing the layer at a virtual address of a screenshot storage area in the host operating system; and
        transmitting contents stored in the screenshot storage area to the guest operating system,
    wherein, the drawing the layer at a virtual address of a screenshot storage area in the host operating system specifically comprises:
        receiving a physical address of the screenshot storage area in the guest operating system;
        translating the physical address into the virtual address of the screenshot storage area in the host operating system; and
        drawing the layer at the virtual address.

8. The computer apparatus according to claim 7, wherein the physical address of the screenshot storage area in the guest operating system is converted from a virtual address of the screenshot storage area in the guest operating system by a guest operating system kernel.

9. The computer apparatus according to claim 7, wherein,
    the physical address of the screenshot storage area in the guest operating system specifically comprises: a physical starting address of the screenshot storage area in the guest operating system, and a size of the storage area; and
    the virtual address of the screenshot storage area in the host operating system specifically comprises: a virtual starting address of the screenshot storage area in the host operating system, and a size of the storage area.

10. The computer apparatus according to claim 8, wherein,
the physical address of the screenshot storage area in the guest operating system specifically comprises: a physical starting address of the screenshot storage area in the guest operating system, and a size of the storage area; and
the virtual address of the screenshot storage area in the guest operating system specifically comprises: a virtual starting address of the screenshot storage area in the guest operating system, and a size of the storage area.

11. The computer apparatus according to claim 7, wherein the transmitting contents stored in the screenshot storage area to the guest operating system specifically comprises:
transmitting the contents stored in the screenshot storage area to the guest operating system through a channel between the host operating system and the guest operating system.

12. The computer apparatus according to claim 7, wherein the looking up a layer corresponding to the display window on the host operating system and assigned to the guest operating system specifically comprises:
looking up the layer corresponding to the display window assigned to the guest operating system from a display layer repository, wherein the display layer repository stores layers corresponding respectively to display windows on the host operating system and assigned to each of guest operating systems.

13. A computer readable medium storing computer readable program instructions thereon, when being executed by a processor, the computer readable program instructions implement steps of:
receiving a screen-shooting request from the guest operating system;
looking up a layer corresponding to the display window on the host operating system and assigned to the guest operating system; and
transmitting the layer to the guest operating system as a displayed guest operating system screenshot,
wherein the transmitting the layer to the guest operating system comprises:
drawing the layer at a virtual address of a screenshot storage area in the host operating system; and
transmitting contents stored in the screenshot storage area to the guest operating system,
wherein, the drawing the layer at a virtual address of a screenshot storage area in the host operating system specifically comprises:
receiving a physical address of the screenshot storage area in the guest operating system;
translating the physical address into the virtual address of the screenshot storage area in the host operating system; and
drawing the layer at the virtual address.

* * * * *